United States Patent [19]

Ray et al.

[11] Patent Number: 4,726,121
[45] Date of Patent: Feb. 23, 1988

[54] SURGICAL CALIPER

[75] Inventors: Charles D. Ray, Wayzata; Matthew L. Meyer, Edina, both of Minn.

[73] Assignee: Cedar Development Corp., Minnetonka, Minn.

[21] Appl. No.: 23,381

[22] Filed: Mar. 9, 1987

[51] Int. Cl.⁴ .............................................. G01B 5/00
[52] U.S. Cl. ............................... 33/143 R; 33/143 C; 33/143 J
[58] Field of Search ............ 33/143 R, 143 C, 143 M, 33/143 J, 143 K, 143 F, 147 R, 147 F, 147 H

[56] References Cited

U.S. PATENT DOCUMENTS 2,828,546  4/1958  Campbell .......................... 33/143 R
3,041,731  7/1962  Keszler ............................. 33/143 R
3,225,447 12/1965  Bryant ............................... 33/143 G

FOREIGN PATENT DOCUMENTS 418655  2/1967  Switzerland ...................... 33/143 P Primary Examiner—Harry N. Haroian
Attorney, Agent, or Firm—Moore & Hansen

[57] ABSTRACT

A caliper that can be operated with one hand to provide accurate direct readings of dimensions within a surgical incision has a fixed jaw at the end of a shaft and a movable jaw at the end of a tube slidably mounted on the shaft. The slidable tube is normally locked in position, but by pressing a button, the user can release the lock, whereupon a coil spring biases the tube and its jaw toward the fixed jaw until their relative movement is stopped by the object being measured. The user then reads the distance between the jaws by the position of a protuberance on the slidable tube relative to a scale etched in the handle.

13 Claims, 3 Drawing Figures

U.S. Patent  Feb. 23, 1988  4,726,121
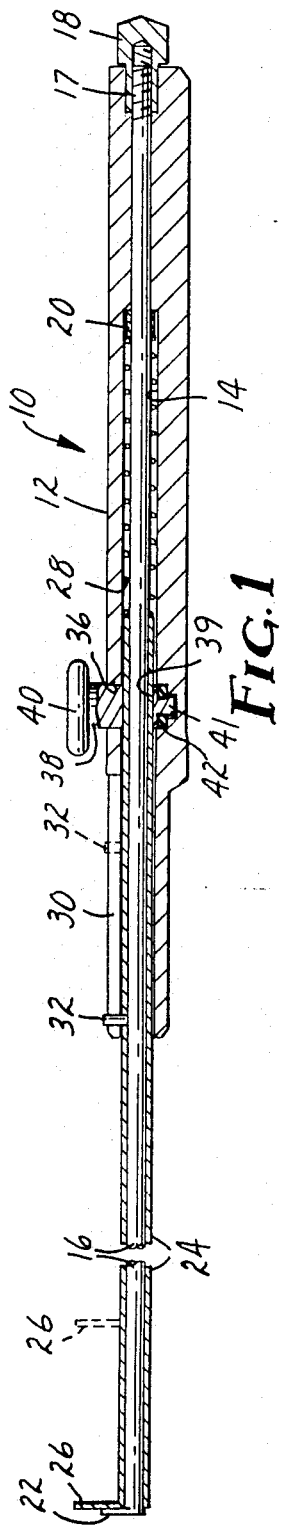
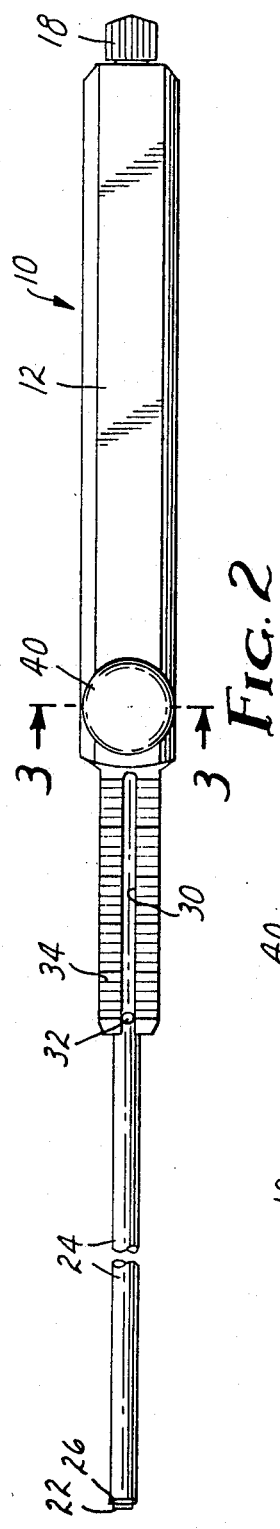
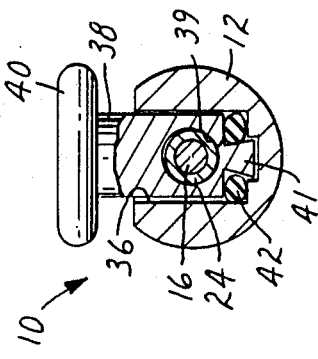

SURGICAL CALIPER

BACKGROUND OF THE INVENTION

1. Field of the Invention

The invention concerns calipers, especially calipers designed for surgical use.

2. Description of Related Art

In order to obtain access to certain lesions lying on the opposite side of a bone structure, relatively large holes (up to 20 mm diameter) must be drilled during a surgical procedure. In order to replace the removed bone either with an appliance or a bone plug, it is desirable to determine the exact depth and diameter of the drilled hole. Calipers or depth gauges currently available for making such measurements require two hands for use, one to hold the instrument in position and the other to release and lock a movable element. Some such instruments provide a direct reading of the measurement, while others require the measured span to be laid against a scale. When the drilled hole is to be filled with a bone plug, it must also be measured.

SUMMARY OF THE INVENTION

The invention provides what is believed to be the first caliper that can be operated with one hand to provide accurate direct readings of dimensions within a surgical incision. Briefly, the novel caliper comprises:

an elongated handle formed with a longitudinal bore containing a shaft, means for fastening one end of the shaft to the handle with its other end projecting from the handle, a first jaw protruding orthogonally from said other end of the shaft, a tube slidably mounted on the shaft within the handle, a second jaw protruding orthogonally from a portion of the slidable tube outside of the handle, means biasing the tube and its jaw toward or away from said first jaw, means normally locking the tube against sliding movement, means mounted on the handle for releasing said locking means to permit the biasing means to slide the tube along the shaft, and an index on the slidable tube, the position of which relative to the handle indicates the spacing between the first and second jaws.

In a prototype caliper of the invention, the handle is elongated and is formed with a slot extending in its direction of elongation. The index comprises a protuberance on the slidable tube which slidably fits in the slot, and a scale formed in the face of the handle extends along said slot. The position of the index along the scale provides a direct reading of the spacing between the jaws. For inside measurements, the total thickness of the two jaws is added to the reading.

In the prototype, a button which protrudes from the handle can be pressed to release a locking element that biases the slidable tube against the wall of the elongated bore in the handle. When the user's thumb depresses the button to unlock the slidable tube, a coil spring which fits around the shaft and is in compression biases the second jaw toward the first.

THE DRAWING

The aforementioned prototype caliper is illustrated in the drawing, all figures of which are schematic, wherein:

FIG. 1 is a side elevation cut away to central section;
FIG. 2 is a top view; and
FIG. 3 is a section along line 3—3 of FIG. 2.

The caliper 10 shown in the drawing comprises an elongated barrel-like handle 12 having a stepped cylindrical bore 14 containing an elongated cylindrical shaft 16, one end of which is formed with a male thread 17 that is screwed into a fastening knob 18. Swaged onto the shaft 16 is a collar 20 which rests against a step of the bore 14 when the knob 18 is tightened to fasten the shaft 16 to the handle. Protruding orthogonally from the shaft 16 at its other extremity is a first (fixed) jaw 22.

Slidably mounted on the shaft 16 is a cylindrical tube 24, from an extremity of which protrudes a second (movable) jaw 26. Also fitting around the shaft is a coil spring 28, the inner and outer diameters of which approximate those of the slidable tube 24 so that one end of the coil spring rests against an end of the tube while the other end of the coil spring rests against the collar 20. In the position shown in FIGS. 1-3, the coil spring is under compression and thus biases the movable second jaw 26 toward contact with the fixed first jaw 22.

The elongated handle 12 is formed with a slot 30 extending in its direction of elongation. Slidably fitting within that slot is a protuberance 32 which has been welded to the slidable tube to provide an index. When the jaws 22 and 26 are in contact, the index is positioned at the zero mark of a scale 34 (FIG. 2) etched in the face of the handle 12 and extending along the slot 30. When the slidable jaw is retracted, the position of the index along the scale provides a direct reading of the spacing between the jaws.

The protuberance 32 is initially cylindrical, but after the caliper 10 has been assembled, its flat outer face can be ground to form an apex aligned with the zero lines of the scale 34. While the protuberance 32 prevents the slidable tube 24 and its movable jaw 26 from rotating, the shaft 16 and its fixed jaw 22 are free to rotate until the fastening knob 18 is tightened. Hence, the user will normally hold the fixed jaw 22 to point in the same direction as the movable jaw 26 while tightening the fastening knob 18, but for making some measurements, it may be desirable to orient the the fixed jaw 22 so that it and the movable jaw 26 point in different directions.

Fitting into an aperture 36 in the handle 12 is the cylindrical stem 38 of a button 40. A cylindrical opening 39 centered on a diameter of the stem slidably receives the slidable tube 24. At the base of the cylindrical stem 38 is a boss 41 carrying an elastomeric O-ring 42 which rests against the base of the aperture 36. The O-ring biases the button 40 outwardly, thus forcing the tube 24 against the portion of the wall of the bore 14 opposite to the O-ring. This locks the slidably tube unless the button 40 is depressed to move the tube 24 out of contact with the wall of the bore 14. If the jaws 22 and 26 are separated when the button is depressed, the movable jaw 26 of the tube is free to move under the bias of the coil spring 28 toward the fixed jaw 22. The O-ring should be selected to provide sufficient resistance to compression that the slidable tube does not move into contact with the portion of the wall of the bore 14 adjacent to the O-ring when the button 40 is depressed.

In order to make a measurement while one holds the handle 12 of the caliper 10 in one hand, the button is depressed by the thumb of that hand, thus unlocking the slidable tube 24 and permitting one's other hand to retract the second jaw 26, thus compressing the coil spring 28. Upon then releasing the button, the slidable tube is locked in the open position and ready to be used for making a measurement with one hand.

When open, the jaws of the caliper can be inserted downwardly into a surgical incision to measure the depth of a hole drilled through a bone or the thickness of other firm tissue. After hooking the fixed first jaw 22 beneath the bone at the bottom of the drilled hole, the button 40 is depressed, thus freeing the slidable tube 24 to slide under the bias of the compressed coil spring 28 until its movable jaw 26 is stopped by the bone at the top of the drilled hole. The button then is released to lock the slidable tube, and the caliper is removed from the incision to permit the user to read the measurement from the position of the index protuberance 32 along the scale 34.

A second technique for making a one-hand measurement is to leave the jaws closed or nearly closed and to press the movable second jaw 26 downwardly against the upper surface of an object and then, while depressing the button, the handle 12 is moved downwardly until the fixed jaw 22 fits around the object. By essentially the same technique, the distance between two upward-facing surfaces can be measured, except that the thickness of the second jaw must be added to the distance indicated by the scale 34. For convenience in making such measurements, the movable jaw 26 projects beyond the fixed jaw 22 in the illustrated prototype.

In order to make inside measurements with the prototype, the user depresses the button 26 and with the other hand retracts the movable jaw 26 against the bias of the coil spring 28. For this reason, a surgeon may wish to have available two calipers of the invention, one like the above-described prototype, and a second identical caliper except that its coil spring is normally in tension, thus biasing the slidable jaw into the maximum open position. To employ the second caliper for measuring the diameter of a bore, one first closes the jaws to a spacing less than the diameter, rests the outer surface of the fixed first jaw against the wall of the bore, then presses the button until the second jaw is moved by the tension of the spring into contact with the opposite face of the bore. Because the second caliper is intended primarily for making inside measurements, it preferably is adjusted so that the reading on its scale allows for the thickness of the jaws.

After using the illustrated caliper to make measurements, it may be sufficient to wipe the shaft 16 while the tube 24 is retracted and to wipe the tube when the jaws nearly contact, followed by sterilization. However, the caliper can be disassembled simply by unscrewing the fastening knob 18, removing the shaft 16 and tube 24, and then lifting out the button 40 with its O-ring. Reassembly should require less than one minute.

The shaft 16 may have a tough plastic coating which is self-lubricating in contact with stainless steel and also resistant to repeated sterilization.

While being primarily intended for use within a surgical incision, the novel caliper should be useful to any mechanic who wishes to use only one hand to make accurate measurements.

EXAMPLE

The prototype caliper was made of stainless steel except that the the handle 12 was anodized aircraft-alloy aluminum and the O-ring 42 was "Viton" fluorocarbon elastomer. Significant dimensions were:

|  | inches | cm |
| --- | --- | --- |
| Handle 12 |  |  |
| length | 4.0 | 10.0 |
| bore 14 |  |  |
| diameter at button | 0.140 | 0.356 |
| diameter at step | 0.096 | 0.244 |
| Tube 24 |  |  |
| outer diameter | 0.120 | 0.305 |
| inner diameter | 0.096 | 0.244 |
| Shaft 16 |  |  |
| length | 8.1 | 20.6 |
| diameter | 0.094 | 0.239 |
| Fixed first jaw 22 |  |  |
| length | 0.1 | 0.254 |
| thickness | 0.020 | 0.0508 |
| Movable second jaw 26 |  |  |
| length | 0.2 | 0.508 |
| thickness | 0.012 | 0.0305 |
| Cylindrical opening 39 | 0.128 | 0.325 |
| O-ring 42 |  |  |
| outer diameter | 0.19 | 0.48 |
| inner diameter | 0.06 | 0.16 |

We claim:

1. Caliper operable by one hand of a person and comprising
   an elongated handle formed with a longitudinal bore containing a shaft,
   means for rotatably receiving the shaft in the handle and for fastening one end of the shaft to the handle with its other end projecting from the handle,
   a first jaw protruding orthogonally from said other end of the shaft in the direction to which it is directed when the shaft is fastened to the handle,
   a tube slidably mounted on the shaft within the handle,
   means preventing the tube from rotating with respect to the handle,
   a second jaw protruding orthogonally from a portion of the slidable tube outside of the handle,
   means biasing the tube and its jaw toward or away from said first jaw,
   means normally locking the tube against sliding movement,
   means mounted on the handle and actuatable by the person for releasing said locking means to permit the biasing means to slide the tube along the shaft, and
   an index on the slidable tube, the position of which relative to the handle indicates the spacing between the first and second jaws.

2. Caliper as defined in claim 1 wherein the handle is elongated in the direction of the shaft and is formed with a slot, and the index comprises a protuberance of the slidable tube which slidably fits in the slot.

3. Caliper as defined in claim 2 wherein a scale formed in the face of the handle extends along said slot.

4. Caliper as defined in claim 1 wherein said fastening means comprises a male screw thread formed on said one end of the shaft and a fastening knob into which the thread fits.

5. Caliper operable by one hand of a person and comprising an elongated handle formed with a stepped longitudinal bore containing a cylindrical shaft to which a collar is fixed, a fastening knob at one end of the handle and to which one end of the shaft is threaded so that when the knob is tightened, the collar rests against the step in the bore to fasten one end of the shaft to the handle with its other end projecting from the handle, a first jaw protruding orthogonally from said other end of the shaft, a tube slidably mounted on the shaft within the handle, a second jaw protruding orthogonally from a portion of the slidable tube outside of the handle, means biasing the tube and its jaw toward or away from said first jaw, means normally locking the tube against sliding movement, means mounted on the handle and actuatable by the person for releasing said locking means to permit the biasing means to slide the tube along the shaft, and an index on the slidable tube, the position of which relative to the handle indicates the spacing between the first and second jaws.

6. Caliper as defined in claim 5 wherein said biasing means is a compression spring which biases the second jaw toward the first.

7. Caliper as defined in claim 6 wherein said compression spring is a coil spring.

8. Caliper as defined in claim 7 wherein the tube is cylindrical, and its inner and outer diameters approximate those of the coil spring.

9. Caliper operable by one hand of a person and comprising an elongated handle formed with a longitudinal bore containing a shaft, means for fastening one end of the shaft to the handle with its other end projecting from the handle, a first jaw protruding orthogonally from said other end of the shaft, a tube slidably mounted on the shaft within the handle, a second jaw protruding orthogonally from a portion of the slidable tube outside of the handle, means biasing the tube and its jaw toward or away from said first jaw, means normally locking the tube against sliding movement, a button mounted on the handle and including a stem formed with an opening into which the tube slidably fits, means biasing the tube against the wall of the bore of the handle to lock the slidably tube against movement until the button is depressed to permit the biasing means to slide the tube along the shaft, and an index on the slidable tube, the position of which relative to the handle indicates the spacing between the first and second jaws.

10. Caliper operable by one hand of a person and comprising an elongated, barrel-like handle formed with a stepped cylindrical bore containing an elongated cylindrical shaft which is longer than the handle, one end of the shaft being formed with a male thread that can be screwed into a fastening knob, a collar fixed to the shaft at a position to rest against a step in said bore to lock the shaft to the handle when the fastening knob is tightened, a first jaw protruding orthogonally from said other end of the shaft, a cylindrical tube slidably mounted on the shaft, fitting into said bore, and protruding from the handle, a second jaw protruding orthogonally from the extremity of the slidable tube outside of the handle, a coil spring, the inside and outside diameters of which approximate those of the tube, mounted on the shaft between the tube and the collar and under mild compression when the first and second jaws are in contact with each other, an aperture formed in the wall of the handle, a button slidably positioned in said aperture and protruding from the handle, which button includes a stem formed with an opening into which the tube slidably fits, means biasing the button outwardly to force the tube against the wall of the bore of the handle to lock the tube against movement until the button is depressed, the wall of the handle being formed with a slot and indexing marks along the slot, and the slidable tube being formed with a protuberance which slidably fits in said slot, the position of which relative to said marks indicates the spacing between the first and second jaws.

11. Caliper as defined in claim 10 wherein said button-biasing means means comprises an elastomeric O-ring.

12. Caliper as defined in claim 11 wherein the distal end of the stem of the button is formed with a boss onto which said O-ring fits.

13. Caliper as defined in claim 12 wherein said protuberance is cylindrical, and its end is formed to an apex which with said indexing marks provides a direct reading of the spacing between the jaws.

* * * * *